United States Patent [19]

Koopman

[11] Patent Number: 4,854,227
[45] Date of Patent: Aug. 8, 1989

[54] APPARATUS FOR FRYING FOOD PRODUCTS

[75] Inventor: R. Nelson Koopman, Hinsdale, Ill.

[73] Assignee: Restaurant Technology, Inc., Oak Brook, Ill.

[21] Appl. No.: 121,988

[22] Filed: Nov. 18, 1987

[51] Int. Cl.[4] .............................................. A47J 37/12
[52] U.S. Cl. ........................................ 99/416; 99/426; 99/403; 211/181
[58] Field of Search ................. 99/403, 405, 410, 415, 99/413, 417, 416, 418, 426, 450, 448; 211/181, 13; D7/409

[56] References Cited

U.S. PATENT DOCUMENTS

| | | | |
|---|---|---|---|
| D. 236,414 | 8/1975 | Kroll | 99/413 X |
| 2,635,528 | 4/1953 | Torres | 99/413 |
| 3,613,553 | 10/1971 | Popeil | 99/403 X |
| 3,985,071 | 10/1976 | Pottinger | 99/403 |
| 4,542,684 | 9/1985 | Cantrell | 99/403 |
| 4,542,685 | 9/1985 | Wilson | 99/413 |
| 4,704,290 | 11/1987 | Fritzsche | 99/403 X |

*Primary Examiner*—Harvey C. Hornsby
*Assistant Examiner*—K. O'Leary
*Attorney, Agent, or Firm*—Jenner & Block

[57] ABSTRACT

An apparatus especially suitable for cooking, in a cooking fluid, food products which lose a portion of their moisture content as vapor during the cooking cycle is provided. The apparatus is configured to allow food products to be spaced and oriented in the apparatus so that during cooking water vapor is expelled from the food products into the vertical convection channels formed by the spacing and orienting of the food products. The expelled buoyant water vapor augments the upward vertical convection of the cooking fluid through the vertical convection channels, thereby improving heat transfer from the cooking fluid to the food products. As a result, cooking time and fat uptake is reduced and a more uniform product quality is provided.

1 Claim, 3 Drawing Sheets

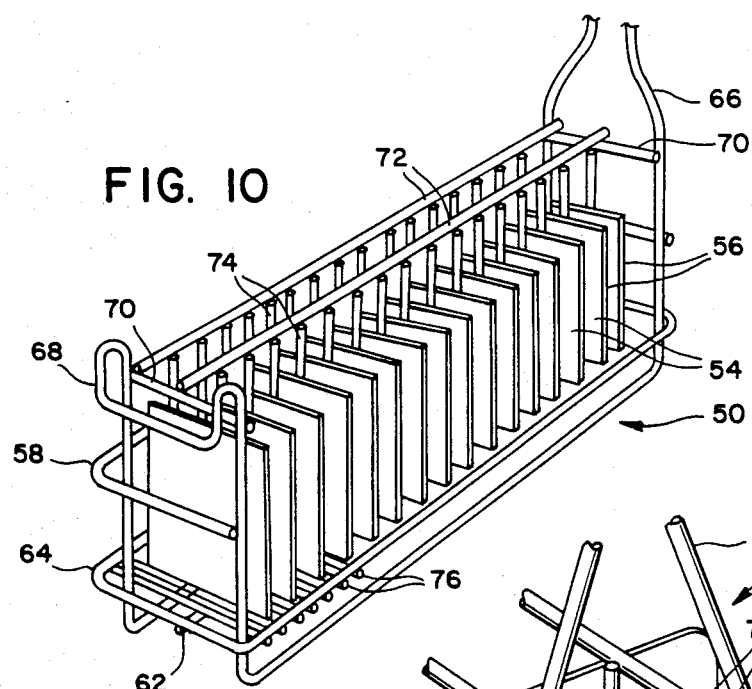
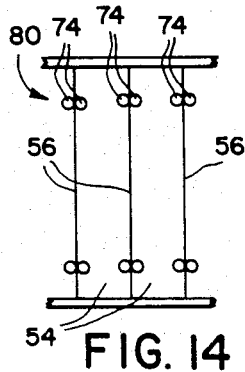
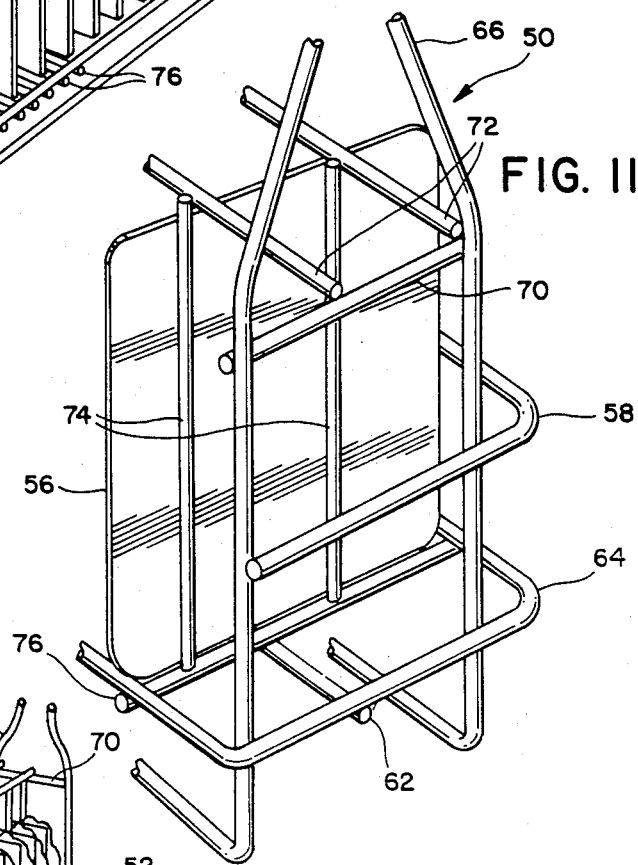
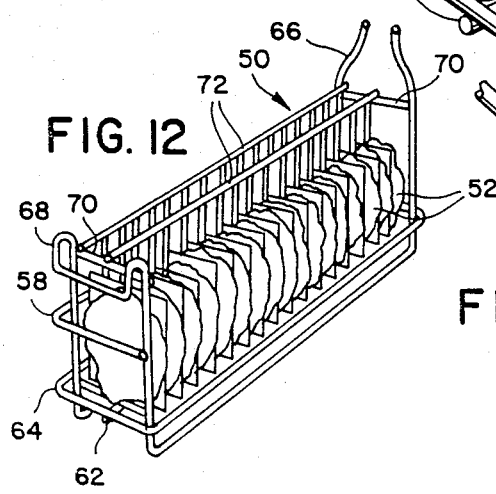
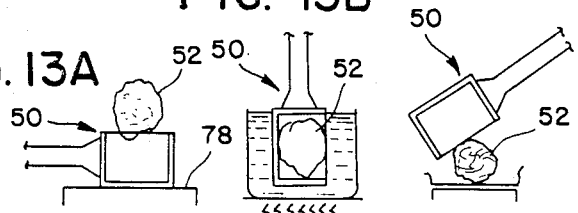

APPARATUS FOR FRYING FOOD PRODUCTS

FIELD OF THE INVENTION

The present invention relates to an apparatus for the frying of food products. More particularly, this invention relates to such an apparatus wherein the food products can be spaced and oriented during the frying cycle to make use of vapor induced heat transfer augmentation. This increased heat transfer results in reduced frying time and fat uptake with a more uniform product quality.

BACKGROUND OF THE INVENTION

The frying of food products is an important part of a restaurant's cooking. Many restaurants have frying vats in which various types of food products are cooked. These food products might include fish fillets, chicken patties, chicken or fish strips, chicken "nuggets," french fries and other food products.

In many restaurants, particularly quick service restaurants, the time that it takes to fry products is important to customer satisfaction. One convenience of these restaurants which potential customers rely on in choosing to dine there is the belief that they could get served quickly.

The need of the quick service restaurant to be able to quickly serve food products is further exacerbated during the traditionally busy periods of lunch and dinner. It is especially during these periods that customers may have to wait in line before ordering. After waiting to place an order, the customer may become impatient if further waiting is required while their food is being cooked. If too many customers are forced to wait, the area where the orders are being taken may become congested. The ability to fry products as quickly as possible is an advantage in these situations.

Further, it may be the case that there are only one or two fryers in a particular restaurant, while there are several food products which need to be cooked in these fryers. If one food product takes a long time to cook, the cooking of other food products in that same fryer must wait until the first food product has been cooked. This could slow the entire operation of the restaurant and further contribute to delays in serving customers.

One alternative would be to fry well in advance a quantity of food products. This way, when a customer needs to be served, these food products have been prepared beforehand, and the customer is served quickly. One disadvantage of this alternative is that quality and appearance of cooked food decreases upon aging. Another disadvantage is that it is difficult to anticipate what foods need to be prepared well in advance of ordering. Such advance preparation of food products may also be logistically impractical.

Current trends also point toward nutrition considerations when a customer chooses a quick service restaurant. Reduced frying time means a reduction in shortening or oil uptake. Fat and calorie levels of the products are therefore lowered.

Finally, it is also important for customer satisfaction to cook food so that consistent and high quality is obtained from one batch to the next as well as throughout each product in the batch.

Various types of fry baskets are known. U.S. Pat. No. 3,985,071 to Kroll discloses a fry basket having a plurality of pouches for frying pies and fish filets. The Kroll fry basket was partially constructed with lightweight, low heat capacity material to decrease heat absorption by the fry basket from the oil. U.S. Pat. No. 4,542,684 to Cantrell discloses a fry basket designed to maintain the food products being cooked in a separated condition. The Cantrell fry basket has a wire rod insert having at least one elongate longitudinal support member rod, a plurality of transverse support member rods and a plurality of elongate separator rods that extend downwardly from each transverse support member.

Currently, chicken nuggets and other smaller food products are fried in a standard fry basket constructed of wire mesh with screen-like sloping side walls, a flat bottom and a handle at one end of the basket that extends above the top edge of the basket. The food products are simply dumped into the fry basket and fried and more or less randomly oriented.

A need exists for an apparatus that reduces the time required to fry food products.

A need exists for an apparatus that consistently fries food to more uniform quality, compared to food fried while essentially randomly oriented, and is suitable for commercial use in quick service restaurants.

A need also exists for an apparatus that reduces the amount of fat contained in foods, compared to food fried while essentially randomly oriented. When food products are fried, some cooking oil is absorbed by the food products. Providing a method and apparatus whereby less oil is absorbed by the food products during frying would be advantageous.

SUMMARY OF THE INVENTION

In accordance with the present invention, an apparatus for cooking moisture containing food products is provided. As used herein, the term "moisture containing" means that the food product contains moisture that is expelled as water vapor during cooking in a cooking fluid, such as by deep fat frying. The invention makes use of the moisture content which is driven off as vapor to augment convection circulation of the cooking fluid to thereby improve heat transfer from the cooling fluid to the food products.

Preferably, the apparatus of the invention is used in accordance with a process for cooking food in a heated cooking fluid. The process for cooking food in a heated cooking fluid includes immersing the food products in the cooking fluid and providing generally vertical convection channels for enhanced convection circulation of the cooking fluid adjacent and in contact with the food products. The food products are maintained in the cooking fluid for a sufficient time to cook the food products while the food products are adjacent to the convection channels. During cooking, water vapor is expelled from the food products into the vertical convection enhanced channels and augments upward vertical convection of the cooking fluid through the convection channels which augments convection heat transfer. The utilization of the buoyant vapor induced convection circulation augmentation reduces cooking time and fat uptake while providing a more uniform product quality, compared to food products that are cooked in unseparated random orientation (such as by dumping the food products into a fry basket without orientation) or without the generally vertical convection channels as defined herein. In effect, a draft or "chimney effect" is created by the buoyant water vapor that is expelled from the food which enhances cooking fluid circulation and convection vertically through the convection channels, adjacent and in contact with the food products.

In accordance with one embodiment of the cooking process, the generally vertical convection channels are provided by the orientation and spacing of the food products. In accordance with another embodiment, the generally vertical convection channels are provided by the orientation and spacing of the food products relative to a plurality of solid, generally vertical walls disposed in the cooking fluid.

Usually, the convection channels will be from about 0.125 to 0.4 inches wide and from about 2 to 5 inches or more in length (vertical weight). Most preferably, the channel width will be from about 0.125 to 0.35 inches. For some types of food, such as 0.5 inch thick fish filets, the preferred channel width is from about 0.125 to about 0.3 inches and most preferably 0.25 inches. The optimum channel width for other types of food products may vary somewhat. The optimum channel width for chicken nuggets having a thickness of about 0.65 inches is about 0.3 inches. An optimum spacing for a particular type of food product can be easily determined by testing various spacings and selecting the one that gives the best combination frying time, fat uptake and food quality, appearance and taste. Usually, the cooking fluid will be a liquid, such as cooking oil, or fat, for example. The width of the convection channels is critical, and the beneficial effects of the invention are rapidly reduced as the channel width increases above 0.4 inches. For example, for fish filets, at a width of about 0.5 inches, the beneficial effects are no longer obtained or are so negligible as to not be apparent.

Usually, the food products will be placed in the desired orientation to provide the vapor induced convection augmentation prior to immersion in the cooking fluid, but this is not necessary, as long as the food products are cooked in the prescribed position for at least part, and preferably most, if not all, of the cooking period.

While the cooking method is suitable for most types and shapes of food, the invention is especially suitable for use with foods that have one or two minor dimensions (herein collectively referred to as having at least one minor dimension). Examples of food products having one minor dimension are food patties, fish filets, hash browns and chicken nuggets, where the thickness is the minor dimension and the length and width or radius are the major dimensions. An example of a food product having two minor dimensions is a french fry, where the length is substantially more than the width and thickness. The method and apparatus of the invention is especially suitable for food patties, chicken nuggets, fish filets, individually sized pies, hash browns and similar types of food products.

Preferably, for food products of the type having at least one minor dimension, the minor dimension is disposed horizontally so that the major dimension(s) of the food defines the height and/or width of the convection channels. Foods shaped and sized like chicken nuggets and has browns can be stacked, preferably with the minor dimension disposed horizontally.

In accordance with another aspect of the invention, the disclosed process for cooking food in a cooking fluid utilizes cooking oil, and the amount of oil absorbed by the food is reduced compared to a process in which food is randomly placed in bulk and cooked in cooking oil.

In accordance with the invention, an apparatus for cooking food products, especially of the type having at least one minor dimension, is provided. The apparatus includes a fry basket defined by side and bottom wire portions. The apparatus further includes a plurality of compartments in the fry basket defined by generally vertical interior wire mesh walls and the fry basket side portion for orienting the minor dimension of the food products generally horizontally and for spacing the food products horizontally close to each other to provide generally vertical convection channels to utilize vapor induced convection augmentation circulation of the cooking fluid adjacent and in contact with the food products. During cooking, the cooking fluid circulates upwardly in contact with the food products by convection through the vertical channels accelerated by buoyant vapor release. Usually, the spacing between the wire mesh walls is from about 0.75 to about 1.5 inches, and preferably about 1.25 inches for cooking chicken nuggets which are about 0.65 inches thick.

In accordance with another embodiment of the apparatus for cooking food products especially of the type having at least one minor dimension, the apparatus includes a fry basket defined by side and bottom portions and a plurality of compartments defined by a plurality of spaced apart generally vertical parallel solid walls in the fry basket for orienting the minor dimension of the food products generally horizontally and for horizontally spacing the food products close to and facing the solid walls so that generally vertical convection channels are formed between the food products and the solid walls. During cooking, the cooking fluid circulates upwardly by vapor augmented convection through the convection channels adjacent and in contact with the solid walls. This spacing between the solid walls is usually from about 0.75 to about 1.25 inches and preferably about 1.000 inches and the solid walls usually have a height of from about 2 to 5 inches, for products such as fish filets about 0.5 inches thick.

One embodiment of the apparatus comprises a fry basket in which a consistently large batch of products is normally cooked and in which the food products are oriented and spaced from each other in such a way that the augmentation heat transfer convection channels are formed. In another embodiment, solid walls are built into the fry basket to form compartments into which the food products are placed during cooking. This embodiment is particularly suitable where varying batch size is encountered or where a small number or even a single food product is to be cooked. The walls serve a similar function as adjacent food products to utilize buoyant vapor to augment convection heat transfer, and the convection channels are provided by the relationship of the walls and the food products. This provides enhanced convection, less oil uptake and more uniform quality regardless of the batch size.

Other objects and advantages of the invention will become apparent upon reading the following detailed description with reference to the drawings. Throughout the drawings, like reference numerals refer to like parts.

BRIEF DESCRIPTION OF THE DRAWINGS

FIG. 10 is a perspective view of another embodiment of the invention wherein solid walls are used to separate certain food products during cooking;

FIG. 11 is a partial transverse sectional view of the fry basket of FIG. 10 of the end of the basket near the handle;

FIG. 12 is a perspective view of the basket of FIG. 10 wherein food products have been placed into each compartment;

FIG. 13A is a partial transverse view of the basket of FIG. 10 whereby the basket is placed on its side for loading of food products;

FIG. 13B is a partial transverse view of the basket of FIG. 13A whereby the food products are being fried;

FIG. 13C is a partial transverse view of the basket of FIG. 13B and illustrates the unloading of cooked products from the basket; and FIG. 14 is a partial plan view of an alternate embodiment of the basket of FIG. 10.

DETAILED DESCRIPTION OF THE PREFERRED INVENTION

Figure 1:
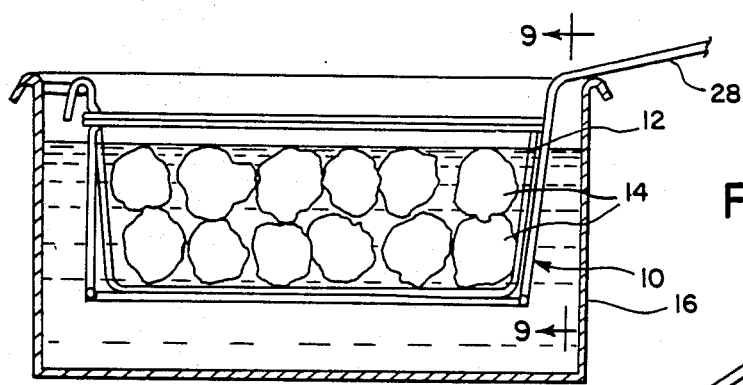
FIG. 1 is a side sectional view of one embodiment of the invention wherein an insert is provided in a cooking basket to vertically orient the food products, shown positioned in a cooking vat.

While the invention is useful for cooking most types and shapes of food, the invention is especially useful for frying foods which have at least one minor dimension. Specifically, this invention is particularly useful to the frying of food products which have a patty-shape, whereby the thickness of the food products is substantially less then the length and/or width of the food products. Examples of such shapes include round patty-shaped or irregular patty-shaped food products, like chicken patties or chicken nuggets, respectively. The major dimension of these food products corresponds to length or radius, while the minor dimensions or dimension corresponds to width and/or height.

Food products having an aspect ratio of 0.4 or less are particularly suited for use in the invention. The aspect ratio is defined as the ratio of the width (thickness) to the length or height of the food product. For example, food products of this type include fish filets, chicken nuggets, and other slab-shaped food products. However, it is to be understood that the invention is not limited to food products having an aspect ratio of 0.4 or less.

Further, food products which lose at least a portion of their moisture content during the cooking process should be used because the invention preferably makes use of the moisture content which is driven off as vapor to augment convection heat transfer of the cooking oil. It has been discovered that particular orientation and spacing of food products relative to each other during frying utilizes the vapor released to augment convection heat transfer. This phenomena has an improved effect on the cooking time and quality of the food products. Although the food products discussed below are illustratively chosen as fish filets and chicken nuggets, orientation and spacing has an effect on all food products which are fried.

Experiments have shown that spacing and orientation of food products are important because of vapor generation and the buoyant bubble detachment effects around the product being cooked. These, in turn, govern the convective heat transfer between the bulk oil and the product. Specifically, the heat transfer coefficient increases with proper spacing and orientation. Furthermore, spacing the food products at a certain distance relative to one another causes convective channeling adjacent to the food products. The movement of the cooking oil in the resulting convective channels induces the bulk oil to recirculate more energetically around the product in a certain pattern. Specifically, the cooking oil forms a pattern whereby the cooking oil circulates vertically from the bottom up along the sides of the food products.

As a result of the increased velocity circulating oil, the local bulk temperature of the oil near the food products is higher and the heat transfer coefficient is augmented resulting in faster heat transfer to the food products. The food products consequently cook faster because the heat transfer is directly proportional to the heat transfer coefficient and magnitude of the temperature driving force. The interplay between both the production of vapor, its ability to sweep up through the vertical channels, and the induced strong convective currents in the bulk oil adjacent the food products is a complex phenomenon. There is an optimum combination which cannot be readily determined from the first principles of multiphase heat/mass transfer, but has been experimentally established.

Figure 9:
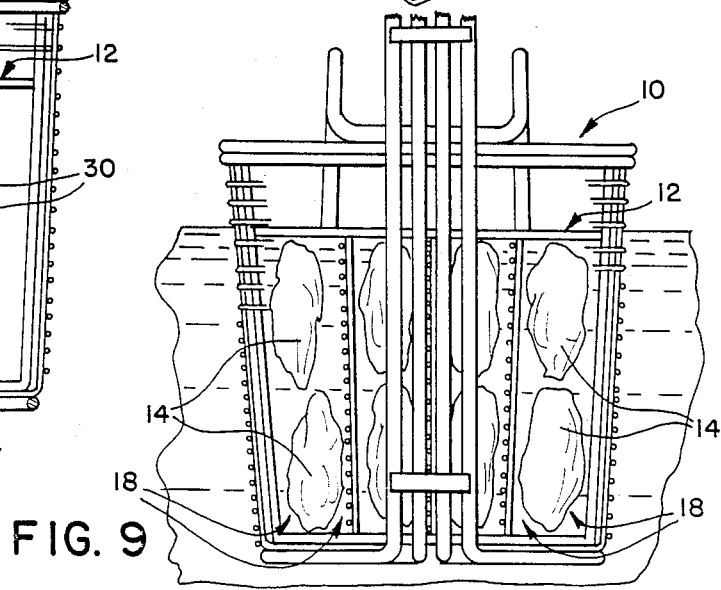
FIG. 9 is a partial transverse view of a loaded basket and insert of FIG. 2 placed in a cooking vat and illustrates the position of the food products during cooking.

Tests have shown the optimal orientation to be the major dimension of the food products being oriented generally vertically during cooking, as shown in FIG. 9, and the minor dimension (thickness) is generally horizontal. Vertical or near-vertical orientation as shown in FIG. 9 provides the best path for the convective circulation to occur unhindered. Tests have shown the optimal spacing of food product to be approximately 0.125 to 0.3 inches and most preferably 0.25 inches from each other for about 0.5 inch thick fish filets cooked in larger batch size.

Further, it has been determined that the vertical convection channels can be formed with two solid walls in place of adjacent food products. When a food product is placed between two solid walls, the effect is virtually the same as if the food product had been placed between two other food products. The solid walls have the same orientation and a spacing optimized to enhance the vapor convection effects for the adjacent food products. This embodiment provides an apparatus in which the forming of the convection channels is not dependent on the number of food products or location loaded into the apparatus.

It has been observed that as the spacing between food products is decreased from a large spacing, the augmentation heat transfer effects of vapor release from the product surface reach an optimum value. Decreasing the product spacing further causes a vapor blockage in the channel and the heat transfer characteristics deteriorate. As the spacing is increased beyond the optimum spacing, vapor generation and release is facilitated, but the induced, augmented oil convection is also reduced in proportion to the widened spacing, and again, heat transfer deteriorates. As used herein, "generally vertical" means in the range of from about 60° to 90° from horizontal. It has been observed that as the orientation is changed from 90° to 60°, the optimum heat transfer augmentation is observed at a greater product spacing. Sloped interproduct spacing retains vapor release and hinders convective augmentation effects in the channel. Preferably the food products are from about 70° to 90° from horizontal, and most preferably are from about 80° to 90° from horizontal.

Referring to the Figures generally and in particular to FIGS. 1–9, there is illustrated various aspects of a fry basket 10 in accordance with the invention. Fry basket 10 includes an insert 12 to be placed in fry basket 10 for the frying of nuggets and other food products. Insert 12 keeps the food products the size of nuggets substantially vertical. FIG. 1 illustrates a fry basket 10 containing chicken nuggets 14 in position within insert 12 in cooking vat 16. There are two advantages to this modification. First, in accordance with the teachings, above, the substantial vertical orientation of chicken nuggets 14, illustrated in FIG. 9, helps create substantially vertical convection channels 18 adjacent to the food products, and better oil circulation and augmented heat transfer characteristics are achieved. As a result, the cooking time is decreased. Second, because of the better circulation of oil, the nuggets are agitated by the oil and vapor turbulence rather than physically shaken during the cooking cycle by the operator. In the conventional method of cooking nuggets, the fry basket is periodically shaken by the operator to ensure that the initially frozen nuggets do not stick together during cooking. If frozen nuggets stick during cooking, the surfaces of the nuggets stuck together do not get properly cooked. Thus, proper cooking depends on proper shaking by the operator. With the present invention, the improved oil circulation and turbulence continuously agitates the nuggets resulting in an improved and more uniform cooked product quality.

Figure 2:
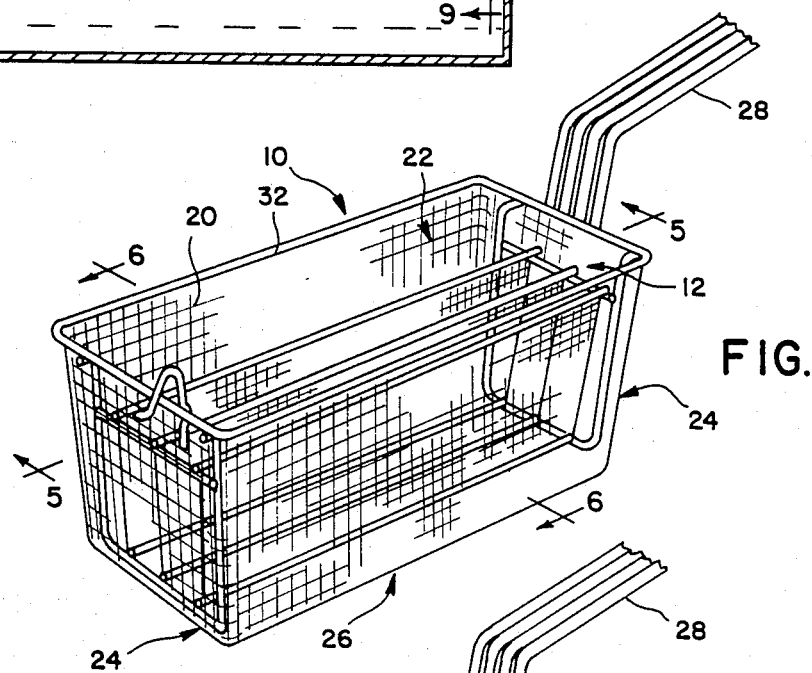
FIG. 2 is a perspective view of the unloaded basket of FIG. 1 in combination with the insert.
Figure 3:
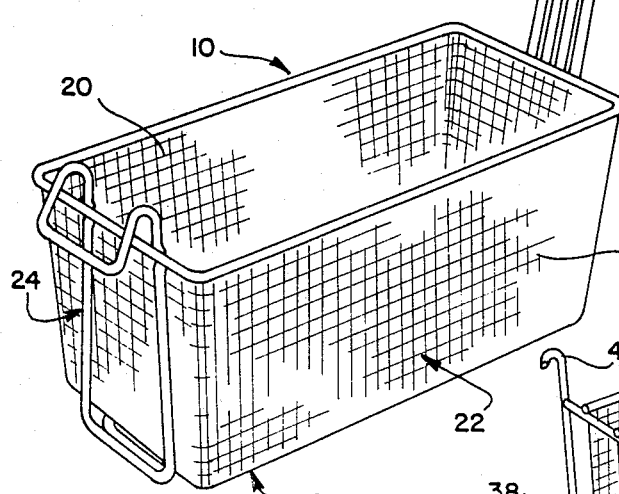
FIG. 3 is a perspective view of the unloaded basket of FIG. 1.

FIG. 2 illustrates the combination of fry basket 10 and insert 12. Basket 10, as depicted in FIG. 2, comprises wire mesh 20, formed into side walls 22, end walls 24 and flat bottom 26, and wire mesh insert 12. A handle 18 extends above the top edge of one end of basket 10.

Figure 4:
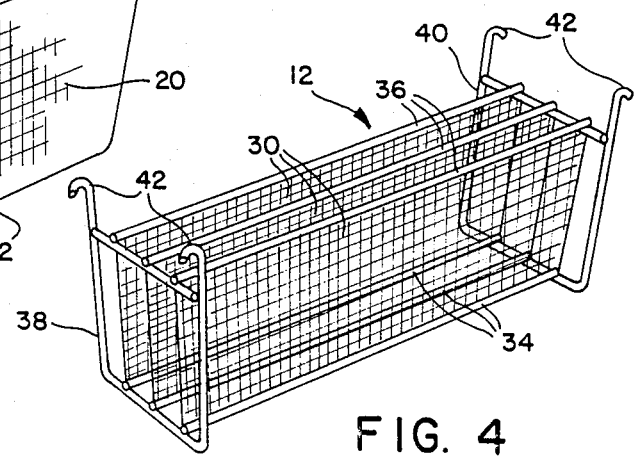
FIG. 4 is a perspective view of the unloaded insert of FIG. 1.
Figure 5:
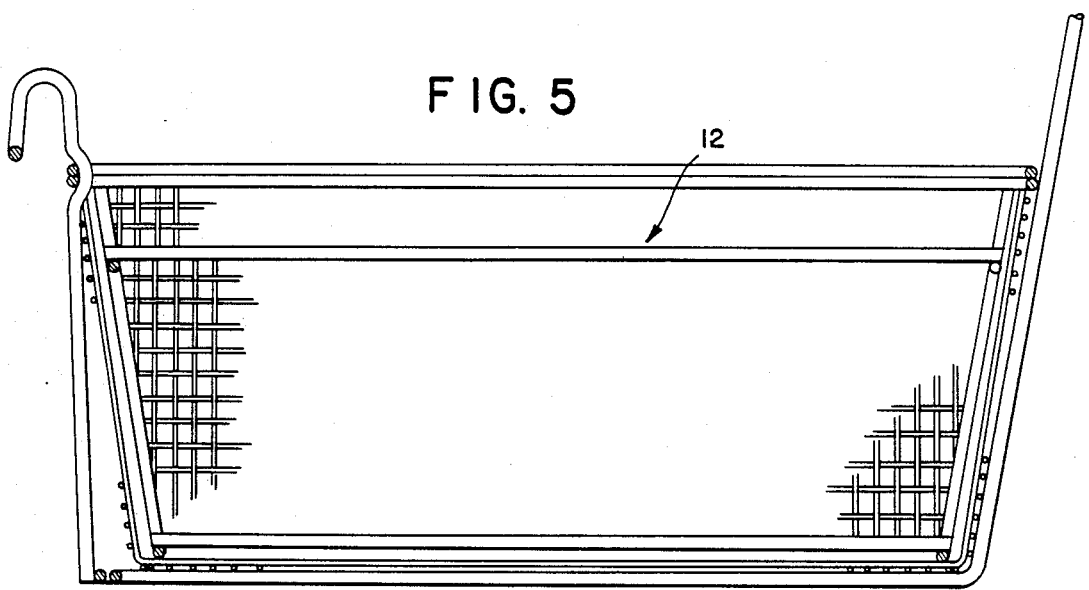
FIG. 5 is a partial longitudinal sectional view taken in the plane of 5—5 of FIG. 2 and illustrating the placement of the insert in the basket.
Figure 6:
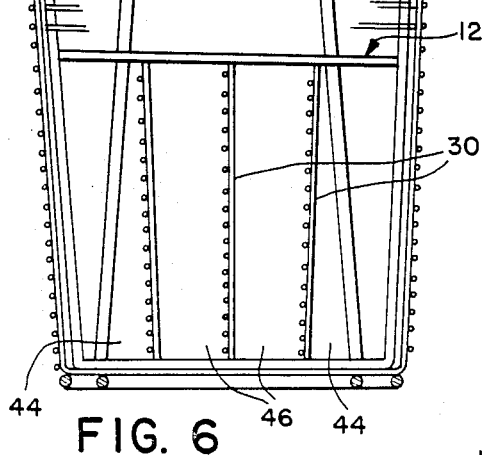
FIG. 6 is a partial transverse sectional view taken on the plane 6—6 of FIG. 2 and illustrating the placement of the insert in the basket.

In FIG. 4 insert 12 is shown separated from the remainder of fry basket 10. Insert 12 comprises a plurality of vertical, parallel wire mesh dividers 30 which extend longitudinally from one end of the interior of the insert 12 to the other. Dividers 30 usually extend from bottom 26 to a height either at the top edge of basket 10 or preferably to some height below the top edge 32 of basket 10. Dividers 30 are supported by transverse bars 36 and 34, extending longitudinally along dividers 30 at their top and bottoms, respectively. Bars 34 and 36 are attached to dividers 30 by spot welding or in some other suitable manner. End frames 38 and 40 provide structure for spacing dividers 30 at a desired distance. Bars 34 and 36 have a length slightly longer than dividers 30, and are attached at each end to frames 38 and 40. End frames 38 and 40 further have a plurality of hooks 42, which assist in keeping insert 12 stationary when placed in basket 10. After insert 12 is inserted into basket 10, four compartments are created, as shown in FIG. 6 and identified by reference numerals 44 and 46. At each of the transverse ends of the combination of insert 12 and basket 10, compartments 44 are formed between dividers 30 and side walls 22 of basket 10. Two inner compartments 46 are formed between dividers 30. Preferably, the compartments are about 1.25 inches wide for cooking chicken nuggets having a thickness of about 0.65 inches.

Figure 7:
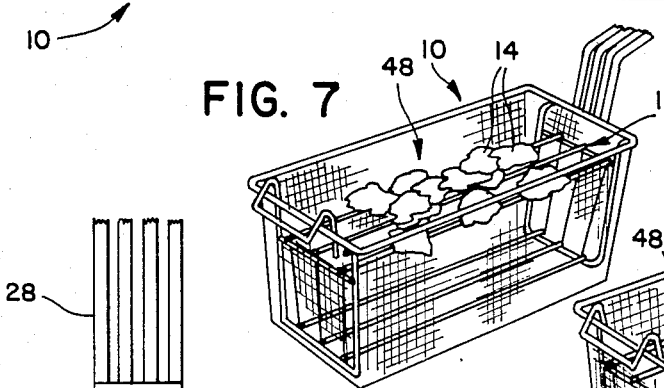
FIG. 7 is a perspective view of the basket and insert and illustrating the placement of food products on the dividers.
Figure 8:
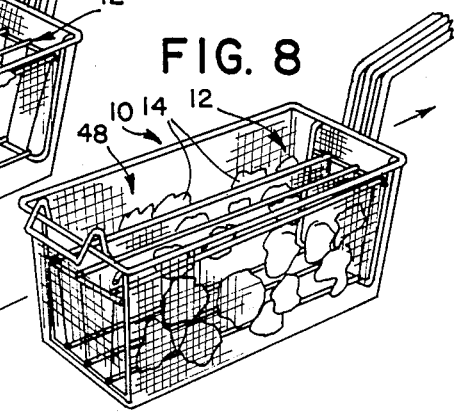
FIG. 8 is a perspective view of the basket and insert and illustrates the loading of the food products between the dividers when the basket in FIG. 7 is shaken to cause products to fall into the compartments.

As shown in FIGS. 7–8, it is preferred that dividers 30 of insert 12 do not extend to a height to top edge 32 of basket 10. This way, a holding area, referred to by reference numeral 48, is created above the top of insert 12. Nuggets 14 may be loaded across the top of dividers 30 such that they do not fall out of the baskets. As shown in FIGS. 8–9, basket 10 and insert 12 may be shaken, whereby nuggets 14 resting on top of insert 12 fall into compartments 44 and 46. As nuggets 14 fall into compartments 44 and 46, they are positioned in the desired vertical orientation. In accordance with the invention, nuggets 14 are oriented vertically in compartments 44 and 46. The loaded basket 10 and insert 12 are placed into a frying vat, as depicted in FIG. 1.

Turning now to FIGS. 10—13A–C, there is illustrated various features of a second embodiment of the invention that comprises a cooking basket 50 in which a plurality of fish filets 52 or some similarly shaped food products are placed for cooking. Basket 50 includes internal compartments 54 which are defined by solid walls 56, cross bar 58 and bottom bar 62. Bottom bar 62 extends longitudinally along the bottom of solid walls 56, whereby filets 52 are prevented from falling out of cooking basket 50. Bottom bar 62 is attached at each end to frame member 64. Frame member 64 extends around the perimeter of basket 50 in the plane perpendicular to the planes defined by walls 56, and the top of frame member 64 being substantially at the same height as the bottoms of walls 56. Cross bar 58 extends longitudinally along one side of basket 50 and curves to transversely extend along the ends of the basket 50. Cross bar 58 also prevents filets 52 from falling out of the side where cross bar 58 is positioned. Basket 50 includes handle 66 which extends above the top of basket 50. Basket 50 is also held in place with hook 68 on the end thereof opposite from handle 65 which engages a rod in the vat (not shown). Basket 50 includes top bars 70 which extend transversely at each end of basket 50. At least one top support member 72 extends longitudinally between top bars 70. This prevents the products from floating out of the compartments during the cooking cycle which would destroy the proper orientation and augmentation enhancements. Attachment of walls 56 to basket 50 is accomplished through attachment of walls 56 to at least one support member 74, which extends vertically from top support members 72. Support members 74 extend partially past walls 56 and are attached to transverse wall bars 76. Transverse wall bars 76 extend transversely and are attached to frame member 64.

In accordance with the invention, walls 56 are spaced apart in such a way that when a filet 52 is placed into a compartment, the sides of filet 52 are placed at an optimized distance from walls 56.

As FIGS. 13A–C depict, the operation of the cooking cycle is as follows. Basket 50 is turned on its side such that cross bar 58 is resting on a surface 78. A desired number of filets 52 are placed into compartments 54. Then, loaded basket 50 is placed into a vat for cooking. After the period for cooking has been achieved, basket 50 is removed from the cooking vat and is tilted so that filets 52 fall out of basket 50 to be further prepared before serving.

FIG. 14 illustrates a cooking basket 80 which is another embodiment of basket 50. Basket 80 is similar to basket 50, except that solid walls 56 have support members 74 on each side of walls 56. Support members 74 are preferably tubular in shape with a diameter of about ⅛ inch, thereby insuring a gap between a food product, such as a fish filet, contained in one of compartments 54, and the adjacent walls 56. Thus, the filet cannot be placed directly against one of walls 56, but placed in a manner so that the existence of a channel on both sides of the filet is insured.

Usually, food will be cooked with a nominal fryer temperature set point in the range of about 325° to about 365° F. It is to be understood, of course, that the invention is applicable to frying temperatures outside of that range. The beneficial effect of the invention may be reduced at higher temperatures such as those above about 365° F. because of vapor blockage in the convection channels.

While the invention is described in connection with several preferred embodiments, it will be understood that it is not intended to limit the invention to these embodiments. On the contrary, it is intended to cover all alternatives, modifications and equivalents as may be included in the spirit and scope of this invention as defined by the appended claims.

I claim:

1. An apparatus for cooking in a heated cooking fluid a plurality of moisture containing chicken nuggets having at least one minor dimension comprising:
    a fry basket having an open top and defined by side wire walls and a flat bottom wire portion;
    a plurality of compartments defined by generally vertical, spaced apart interior wire walls in said fry basket and said side wire walls, said spacing between said wire walls is from about 0.575 to about 1.5 inches for orienting the minor dimension of said chicken nuggets generally horizontally and for spacing said chicken nuggets horizontally close ot each other to provide generally vertical convection channels for convection circulation of said cooking fluid adjacent and in contact with said chicken nuggets, whereby vapor escaping from said chicken nuggets passes into said vertical convection channels, augmenting upward vertical convection of said cooking fluid through said vertical convection channels adjacent and in contact with said chicken nuggets; and
    said side wire walls extending above said interior wire walls to provide a holding area allowing said chicken nuggets to be placed along the top of said interior wire walls.

* * * * *

UNITED STATES PATENT AND TRADEMARK OFFICE
CERTIFICATE OF CORRECTION

PATENT NO. : 4,854,227
DATED : August 8, 1989
INVENTOR(S) : R. Nelson Koopman

It is certified that error appears in the above-identified patent and that said Letters Patent is hereby corrected as shown below:

Column 1, line 18, delete "fillets" and insert therefor --filets--.

Column 2, line 41, delete "cooling" and insert therefor --cooking--.

Column 3, line 13, delete "weight" and insert therefor --height--.

Column 3, line 61, delete "has" and insert therefor --hash--.

Column 7, line 49, delete "18" and insert therefor --28--.

Column 8, line 45, delete "65" and insert therefor --66--.

Column 10, line 15, delete "ot" and insert therefor --to--.

Signed and Sealed this

Fourteenth Day of December, 1993

Attest:

BRUCE LEHMAN

*Attesting Officer*  *Commissioner of Patents and Trademarks*